United States Patent Office 3,187,016
Patented June 1, 1965

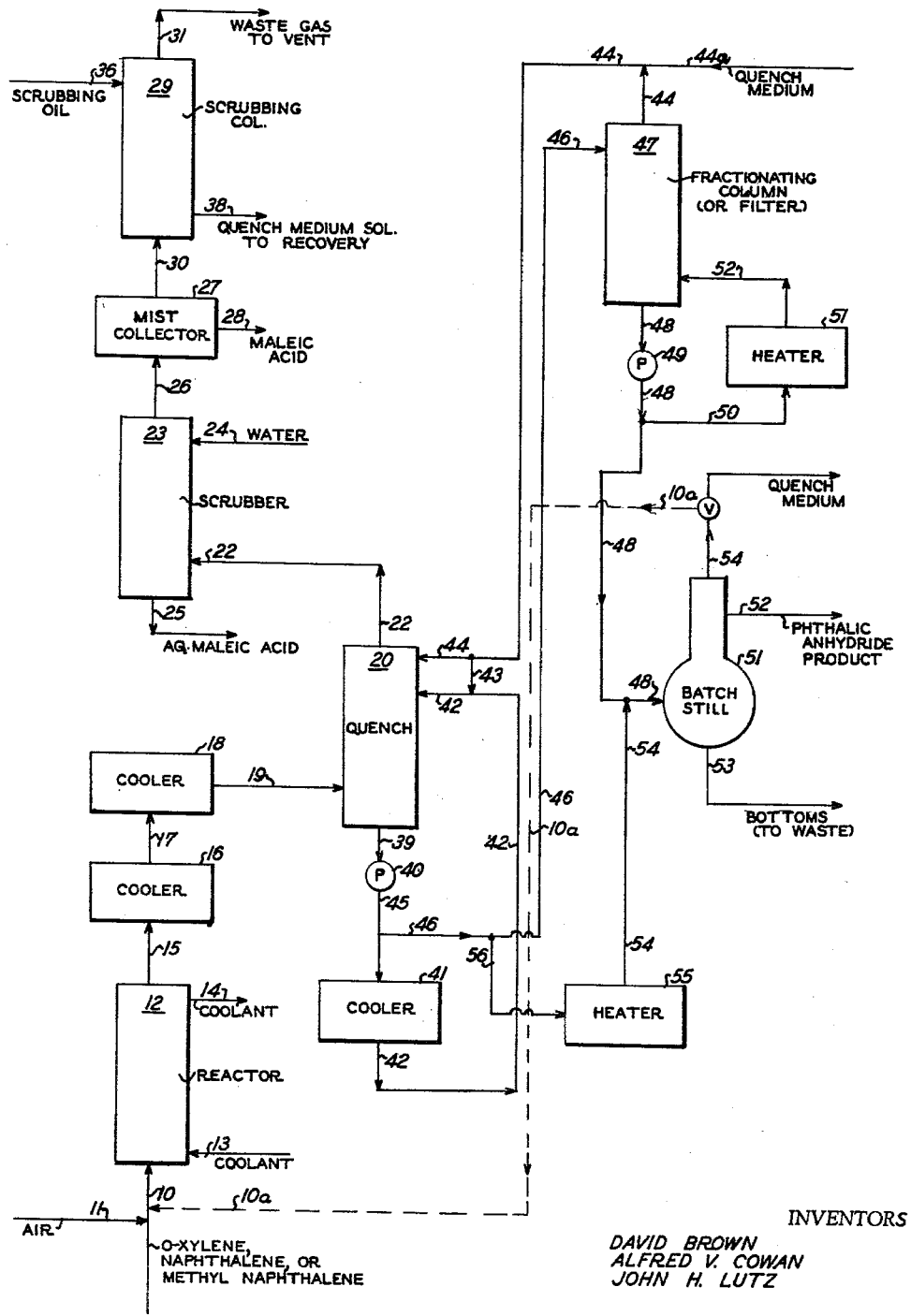

3,187,016
RECOVERY OF PHTHALIC ANHYDRIDE
David Brown, Milbrook, Greenwich, Conn., Alfred V. Cowan, New York, N.Y., and John H. Lutz, Wyckoff, N.J., assignors to Halcon International, Inc., a corporation of Delaware
Filed Oct. 16, 1961, Ser. No. 145,120
7 Claims. (Cl. 260—346.4)

This invention relates to processes for producing phthalic anhydride by the vapor phase partial oxidation of a suitable hydrocarbon such as naphthalene, ortho-xylene, or methyl-naphthalene, more particularly to such a process wherein the gaseous reaction mixture is quenched by means of a liquid to condense out the phthalic anhydride therefrom and form a mixture of the anhydride with the quench medium, following which the phthalic anhydride is separated from the quench medium. It also relates to apparatus suitable for use in such a process.

In plants for the production of phthalic anhydride, a conventional method of recovery of phthalic anhydride from the gas stream leaving the reactor has involved the use of switch condensers, which collect the product as a solid on an extended heat transfer surface, and then remove it from this surface by re-melting. This equipment is large, expensive, and difficult to operate and maintain. Another method has involved the use of a water scrubber to scrub the phthalic anhydride from the gases. This system has many disadvantages. Phthalic anhydride is only partially soluble in water. Phthalic anhydride is actually collected as a water slurry of phthalic acid which must later be dehydrated. The phthalic acid solution so obtained also contains significant portions of maleic anhydride which introduce separation problems. The water solution is very corrosive and necessitates expensive materials of construction.

The art is confronted by the problem of providing processes and apparatus for producing phthalic anhydride in an even more convenient and economic manner, which avoid the foregoing disadvantages.

The discoveries associated with the invention and relating to the solution of the above problems, and the objects achieved in accordance with the invention as set forth herein include the provision of:

A process for preparing phthalic anhydride by the vapor phase partial oxidation of a suitable hydrocarbon followed by recovery of phthalic anhydride from the reaction mixture the improvement which comprises quenching the phthalic anhydride from said mixture by means of a liquid to form a mixture containing anhydride and recovering said anhydride from said mixture;

Such a process wherein the phthalic anhydride is recovered therefrom the suspended slurry of distillation;

Such a process in which the phthalic anhydride is recovered from the suspended slurry by distillation and the phthalic anhydride is separated as a bottoms product from this distillation;

Such a process wherein the quench medium has an atmospheric boiling point between 200° C. and 275° C., and a freezing point below 50° C.;

Such a process wherein the liquid mixture contains phthalic anhydride as a solid phase and phthalic anhydride is recovered therefrom by physical separation of the solid from the liquid;

Such a process wherein the quench medium is a methyl-naphthalene;

Such a process wherein the hydrocarbon which is partially oxidized is a methyl naphthalene;

Such a process wherein a fraction of the quench medium separated from the phthalic anhydride mixture is included in the feed mixture to be partially oxidized;

Such a process wherein the off-gases from the quench treatment are scrubbed with water to recover maleic acid and maleic anhydride which are recovered as an aqueous solution therefrom;

Such a process wherein the off-gases from the water scrubbing are treated with a scrubbing medium to recover any quench medium therein;

An apparatus suitable for use in preparing phthalic anhydride including the combination of a reactor, quenching means for separating the anhydride from the reaction mixture, and recovery means for separating the anhydride from the quench mixture;

And other objects which will be apparent as details or embodiments of the invention are set forth hereinafter.

The accompanying drawing illustrates schematically a preferred embodiment of the present invention, as well as an alternative thereof.

In order to indicate still more fully the nature of the present invention the following examples of typical procedures are set forth in which parts and percents mean parts and percents by weights, respectively, unless otherwise indicated, it being understood that these examples are presented as illustrative only and they are not intended to limit the scope of the invention.

Example 1

Referring to the accompanying drawing, the feed mixture containing 100 mols of ortho-xylene is fed via line 10 into reactor 12, and 8000 mols of air is fed thereinto via line 11. This reactor may be a usual tubular type loaded with catalyst, and cooling medium is circulated thereinto around the tubes and then out via lines 13 and 14. The gaseous reaction mixture is passed via line 15 to primary cooler 16 wherein it is partially cooled and then to secondary cooler 18 wherein it is further cooled to about 250° F. following which it is passed via line 19 to quench column 20. This column may be provided with trays, or usual packing, discs, baffles, or the like. Quench medium is fed into this column via lines 42 and 44 (and 44a) and the gases are contacted therewith in countercurrent manner at a liquid temperature of about 150° F., whereby the phthalic anhydride is selectively condensed from the gaseous mixture and forms a solid suspension in the quench medium. The liquid mixture containing the suspended solids is passed via line 39, pump 40 and lines 45 and 46 to fractionating column 47. The drawoff rate via line 46 is controlled to maintain the slurry at the desired concentration, say 10–40% wt. The quench medium is separated therein and is recirculated via line 44 to the quench column. A part of the mixture from quench column 20 may be passed via line 45 to cooler 41 wherein it is cooled to about 140° F., and then recirculated via line 42 to the quench column. If desired, a part of the quench medium may be passed from line 44 via line 43 into line 42 and then quench to column 20.

The phthalic anhydride fraction is passed from column 47 via line 48 and pump 49 to still 51 (which may be a batch still or, if desired, a fractionating column or a system of two fractionating columns in series). If desired a part of the phthalic anhydride fraction from column 47 may be passed via line 50 to heater 51 wherein it is heated and then passed via line 52 back to column 47. If desired, a part of the mixture from quench column 20 may be passed via line 56 to heater 55 and then via lines 54 and 48 to still 51a. Phthalic anhydride product is removed from still 51a via line 52a, and bottoms or waste is removed therefrom via line 53. A quench medium fraction may be separated therefrom and removed via line 54, from which it may be introduced into the previously described quench medium circuit. Alternatively this quench medium fraction may be passed via lines 10a and 10 to reactor 12, if it is a suitable hydrocarbon for conversion to phthalic anhydride, e.g., 1-methyl-naphthalene.

The off-gases from quench column 20 are passed via line 22 to scrubbing column 23 wherein they are scrubbed with water which is introduced via line 24. Aqueous maleic acid is separated therefrom via line 25 and may be processed in the usual manner to recover maleic acid, maleic anhydride, or fumaric acid. The off-gases from column 23 may be passed via line 26 to a mist collector 27, which may be a usual cyclone separator. Separated maleic acid liquid is removed therefrom via line 28. The resulting gases are passed via line 30 to scrubber column 29 where they are scrubbed with a high-boiling hydrocarbon oil which is introduced via line 36. The quench medium is scrubbed from the gases by means of this oil, and the solution of the medium in the oil is removed via line 38. This solution may be processed in a conventional manner such as distillation to recover the quench medium. The residual gases are removed via line 31 and vented as waste gas. Alternatively the scrubber column 29 may be replaced by an activated carbon bed for removal of quench medium from the waste gas.

A methyl-naphthalene or a mixture of methyl-naphthalenes is a desirable quench medium and also it is a desirable hydrocarbon for converting to phthalic anhydride. Accordingly, some of the recovered methyl-naphthalene may be used as feed to the reactor. In this way, high conversions and high yields are obtained of the desired phthalic anhydride at much lower capital requirements than usual methods and apparatus.

*Example 2*

The procedure of Example 1 is repeated except that the fractionating column 47 is replaced by a filter or the like unit or means for separating solid from liquid. The liquid filtrate or effluent is recycled via line 44 to the quench column. The filter cake may be transported in usual equipment, or slurried or melted and pumped via line 48 to the still 51, and processed as above described.

This system also gives improved conversions or yields of the desired product.

Comparable results to the foregoing may be achieved with various modifications thereof including the following. The quench medium should be economical and stable, and have a freezing point less than about 50° C. Its boiling point should be at least 10–20° C. away from that of phthalic anhydride. The boiling point should not be lower than about 150° to 200° C. or recovery becomes difficult. If it boils lower than phthalic anhydride, it should not form a low boiling azeotrope containing more than about 25 wt. percent phthalic anhydride. If it boils higher than phthalic anhydride it preferably should not form any low boiling azeotrope therewith.

The organic quench liquid should have low vapor pressure but boil sufficiently below the boiling point of phthalic anhydride so as to permit reasonably simple separation. It should have a low viscosity at the temperature of operation of the phthalic anhydride condenser. It should be thermally stable and non-reactive with phthalic or maleic anhydrides. There are a number of aliphatic and aromatic petroleum fractions which are acceptable. If desired a water extraction step can be used to extract maleic anhydride from the quench medium. A compound such as 1-methyl-naphthalene has a melting point of −22° C., low viscosity at 50° C., and a boiling point of 240–243° C. A commercial cut approximating 1-methyl-naphthalene in properties is suitable; such a cut may be a mixture of 1- and 2-methyl-naphthalenes.

If the vapor pressure of the organic quench liquid is sufficiently high so as to represent a significant economic loss through the relatively large volume of lean gas, a final scrubber employing a heavier oil may be desired. Operation of a condenser at a sufficiently low temperature to reduce this loss to a negligible point is, of course, possible. Carbon adsorption is also a suitable recovery method.

In the case of physical separation of the solids, any standard device for separating solids from liquids such as a filter or a centrifuge may be used. The separated liquor is then cooled and returned to the quench column. All or part of this organic liquid stream may be sent to a usual liquid-liquid contactor (not shown) for extraction of the maleic acid content by water. This maleic acid stream is then treated for recovery of maleic anhydride values by conventional techniques. All or part of the organic liquid stream from this extraction step can then be sent to a distillation column for separation of the organic liquid from tars, naphthaquinones, and other such materials prior to re-use.

The streams or organic liquids are then combined and returned to the phthalic anhydride quench. The separated wet phthalic anhydride cake may be introduced into a melt tank (not shown) containing a controlled level of molten phthalic anhydride. The molten material would be continuously removed and fed to a refining system. This system could be either batch refining column as is conventional, or a two-column refining system. In the two-column refining system it is contemplated that the organic liquid and other light ends would be removed in the first column as overhead and recycle to the phthalic anhydride quench. The bottoms from this column may proceed to a second column where phthalic anhydride would be removed as an overhead product and the bottoms (if any) discarded.

Many advantages result from this process and system: Lower capital cost by reason of the smaller size and simplicity of equipment required; lower capital cost because of the avoidance of usage of stainless steel; low utility cost if efficient heat transfer and heat interchange between lean and rich streams is used. High purity phthalic anhydride crude is obtained and permits the production of a higher grade product. There is virtually complete separation of phthalic anhydride from maleic anhydride. It may be possible to eliminate phthalic anhydride crude treatment because of the separation of naphthaquinones. There is lower tar formation because of improved phthalic anhydride crude resulting in less severe distillation conditions; and higher yields of phthalic anhydride. This scheme permits the use of a continuous refining system for phthalic anhydride which is of economic advantage in larger capacity plants.

In view of the foregoing disclosures, variations and modifications thereof will be apparent to one skilled in the art, and it is intended to include within the invention all such variations and modifications except as do not come within the scope of the appended claims.

What is claimed is:

1. In a process for the production of phthalic anhydride wherein a suitable hydrocarbon is partially oxidized in the vapor phase to form a reactor effluent containing phthalic anhydride, the improvement of passing said reactor effluent into a quenching zone; contacting said effluent with methylnaphthalene thereby cooling said effluent and forming a slurry containing solid phthalic anhydride; separating the crude phthalic anhydride from said slurry; and distilling the crude phthalic anhydride and separating pure phthalic anhydride as a distillate.

2. The process of claim 1 wherein the slurry formed in said quenching zone has from 10 to 40 weight percent solids.

3. The process of claim 1 wherein a portion of the quenching medium separated from said phthalic anhydride is recycled as feed to said partial oxidation.

4. A process of claim 1 wherein said suitable hydrocarbon is selected from the group consisting of naphthalene and ortho-xylene.

5. The process of claim 1 wherein the uncondensed reactor effluent leaving said quenching zone is scrubbed with water to recover maleic acid.

6. The process of claim 1 wherein the quench medium is maintained at a temperature of about 150° F.

7. A process for the production of phthalic anhydride which comprises: partially oxidizing a hydrocarbon selected from the group consisting of naphthalene and ortho-xylene with a molecular oxygen-containing gas in the vapor phase; withdrawing a gaseous reactor effluent containing phthalic anhydride and maleic anhydride; cooling said reactor effluent to about 250° F.; contacting said cooled reactor effluent with methylnaphthalene in a quenching zone at a temperature of about 150° F., thereby condensing a portion of said reactor effluent and forming a slurry of 10 to 40% by weight solid phthalic anhydride in said methylnaphthalene; withdrawing the uncondensed portion of said reactor effluent and scrubbing the same with water to recover maleic acid; withdrawing said slurry from said quenching zone; filtering said slurry to separate a crude phthalic anhydride and the bulk of said methylnaphthalene; recycling the methylnaphthalene to said quenching zone; and distilling said crude phthalic anhydride and withdrawing as a distillate pure phthalic anhydride.

References Cited by the Examiner
UNITED STATES PATENTS

| | | | |
|---|---|---|---|
| 2,140,140 | 12/38 | Punnett | 260—346.4 |
| 2,574,644 | 11/51 | Landau | 260—346.8 |
| 3,112,324 | 11/63 | Foucar | 260—346.4 |

OTHER REFERENCES

Morita: Bull. Soc. Chem. Japan, vol. 33 (1960), pp. 511–5.

IRVING MARCUS, *Primary Examiner.*
NICHOLAS S. RIZZO, *Examiner.*